(12) United States Patent
Minjeur et al.

(10) Patent No.: US 12,304,359 B2
(45) Date of Patent: May 20, 2025

(54) VEHICLE SEAT HAVING A SEAT BASE INCLUDING AN ADJUSTABLE CENTER SUPPORT

(71) Applicant: GM Global Technology Operations LLC, Detroit, MI (US)

(72) Inventors: Patrick Minjeur, Sterling Heights, MI (US); Siddhant Kansal, Hazel Park, MI (US); Nilesh D. Mankame, Ann Arbor, MI (US); Gregory Koch, Harrison Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 226 days.

(21) Appl. No.: 18/169,287

(22) Filed: Feb. 15, 2023

(65) Prior Publication Data

US 2024/0270124 A1    Aug. 15, 2024

(51) Int. Cl.
*B60N 2/02*    (2006.01)
*B60N 2/64*    (2006.01)

(52) U.S. Cl.
CPC .......... *B60N 2/02246* (2023.08); *B60N 2/64* (2013.01); *B60N 2/02253* (2023.08)

(58) Field of Classification Search
USPC ...................................... 297/284.1
See application file for complete search history.

(56) References Cited

U.S. PATENT DOCUMENTS

| 3,378,299 | A | * | 4/1968 | Sandor | B60N 2/7058 267/89 |
|---|---|---|---|---|---|
| 4,842,334 | A | * | 6/1989 | Voss | B60N 2/0284 297/344.14 |
| 5,896,604 | A | * | 4/1999 | McLean | A47C 19/027 297/284.8 |
| 6,109,693 | A | * | 8/2000 | Bauer | B60N 2/1615 297/284.3 |
| 6,203,105 | B1 | * | 3/2001 | Rhodes, Jr. | B60N 2/806 297/284.6 |
| 11,635,154 | B2 | * | 4/2023 | Beuschel | B60N 2/643 297/284.1 |
| 11,648,859 | B2 | * | 5/2023 | Mizoi | B60N 2/99 297/284.1 |
| 11,738,675 | B2 | * | 8/2023 | Therry | B60N 2/914 297/284.1 |
| 2003/0071500 | A1 | * | 4/2003 | Dinkel | A47C 7/467 297/284.1 |
| 2009/0218859 | A1 | * | 9/2009 | Lawall | B60N 2/42763 297/284.1 |
| 2010/0276973 | A1 | * | 11/2010 | Zenk | B60N 2/0277 297/284.3 |
| 2010/0289302 | A1 | * | 11/2010 | Cheng | B60N 2/0248 700/282 |
| 2013/0257126 | A1 | * | 10/2013 | Freisleben | B60N 2/0284 29/428 |
| 2014/0265492 | A1 | * | 9/2014 | Larsen | F16K 99/0042 137/884 |

(Continued)

*Primary Examiner* — Jose V Chen
(74) *Attorney, Agent, or Firm* — CANTOR COLBURN LLP

(57) ABSTRACT

A vehicle seat includes a seat base including a center support, a seat back mounted to the seat base, and an adjustment mechanism operatively connected to the center support. The adjustment mechanism is operable to selectively raise and lower the center support relative to the seat base.

20 Claims, 8 Drawing Sheets

(56) References Cited

U.S. PATENT DOCUMENTS

| | | | |
|---|---|---|---|
| 2014/0333107 A1* | 11/2014 | Seki | B60N 2/161 |
| | | | 297/284.1 |
| 2016/0185263 A1* | 6/2016 | Uno | B60N 2/665 |
| | | | 297/284.1 |
| 2018/0222356 A1* | 8/2018 | Ishihara | B60N 2/1615 |
| 2018/0345823 A1* | 12/2018 | Zouzal | B60N 2/0244 |
| 2020/0254911 A1* | 8/2020 | Line | B60N 2/02246 |
| 2021/0229573 A1* | 7/2021 | Fischer | B60N 2/164 |
| 2023/0129527 A1* | 4/2023 | Kimbara | B60N 2/5816 |
| | | | 297/284.1 |

* cited by examiner

VEHICLE SEAT HAVING A SEAT BASE INCLUDING AN ADJUSTABLE CENTER SUPPORT

INTRODUCTION

The subject disclosure relates to the art of vehicle seats and, more particularly, to a vehicle seat having a seat base including an adjustable center support.

Many vehicles include standard seats having a seating surface that is recessed relative to side bolsters. The side bolsters are designed to provide support to an occupant during turns. There is a trade-off between support and convenience. On one hand, a recessed seating surface and standard bolsters, or bolsters that extend above the seating surface a small amount provide minimal support. The standard bolsters do not however impede ingress and exiting the vehicle.

Larger bolsters are favored by drivers of performance vehicles. Larger bolsters provide greater support, particularly during vehicle maneuvers. However, the larger bolsters make getting into and out from the vehicle more difficult. Accordingly, it is desirable to provide an adjustable seat base in a vehicle that not only provide support while the vehicle is maneuvering but also allow for easy ingress and exiting of the vehicle.

SUMMARY

A vehicle seat, in accordance with a non-limiting example, includes a seat base including a center support, a seat back mounted to the seat base, and an adjustment mechanism operatively connected to the center support. The adjustment mechanism is operable to selectively raise and lower the center support relative to the seat base.

In addition to one or more of the features described herein the center support includes a first end pivotally connected to the seat base, and a second end connected to the adjustment mechanism.

In addition to one or more of the features described herein the adjustment mechanism includes a linkage operatively connected to a motor, the motor being operable to raise the second end of the center support.

In addition to one or more of the features described herein an actuator is operatively connected to the adjustment mechanism, the actuator being mounted to the seat base.

In addition to one or more of the features described herein the adjustment mechanism comprises an inflatable bladder.

In addition to one or more of the features described herein the center support includes a plurality of members that are selectively shiftable through the adjustment mechanism.

In addition to one or more of the features described herein a first side bolster, a second side bolster, and a thigh support are fixedly mounted relative to the seat base, the center support being positioned aft of the thigh support and inwardly of the first side bolster and the second side bolster.

A vehicle in accordance with a non-limiting example, includes a body defining a passenger compartment and a seat mounted in the passenger compartment. The seat includes a seat base having a center support, a seat back mounted to the seat base, and an adjustment mechanism operatively connected to the center support. The adjustment mechanism is operable to selectively raise and lower the center support relative to the seat base.

In addition to one or more of the features described herein the center support includes a first end pivotally connected to the seat base, and a second end connected to the adjustment mechanism.

In addition to one or more of the features described herein the adjustment mechanism includes a linkage operatively connected to a motor, the motor being operable to raise the second end of the center support.

In addition to one or more of the features described herein an actuator is operatively connected to the adjustment mechanism, the actuator being mounted to the seat base.

In addition to one or more of the features described herein the adjustment mechanism comprises an inflatable bladder.

In addition to one or more of the features described herein the center support includes a plurality of members that are selectively shiftable through the adjustment mechanism.

In addition to one or more of the features described herein a first side bolster, a second side bolster, and a thigh support are fixedly mounted relative to the seat base, the center support being positioned aft of the thigh support and inwardly of the first side bolster and the second side bolster.

A method of adjusting a seat center support in a vehicle, in accordance with a non-limiting example, includes activating an adjustment mechanism to raise the center support from a first position to a second position, and raising the center support relative to a seat base.

In addition to one or more of the features described herein raising the center support includes extending a linkage including a first link member rotatably supported to the seat base and a second link member rotatably coupled to the first link member and the center support.

In addition to one or more of the features described herein extending the linkage includes activating a motor operatively connected to the first link member.

In addition to one or more of the features described herein raising the center support includes inflating an inflatable bladder arranged below the center support.

In addition to one or more of the features described herein raising the center support includes raising the center support from the first position spaced a first distance from a vehicle floor to the second position spaced a second distance from the vehicle floor, wherein the second distance is substantially even with a forward edge of the seat base.

In addition to one or more of the features described herein raising the center support is automatically actuated upon one of unlocking a vehicle door and opening the vehicle door.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
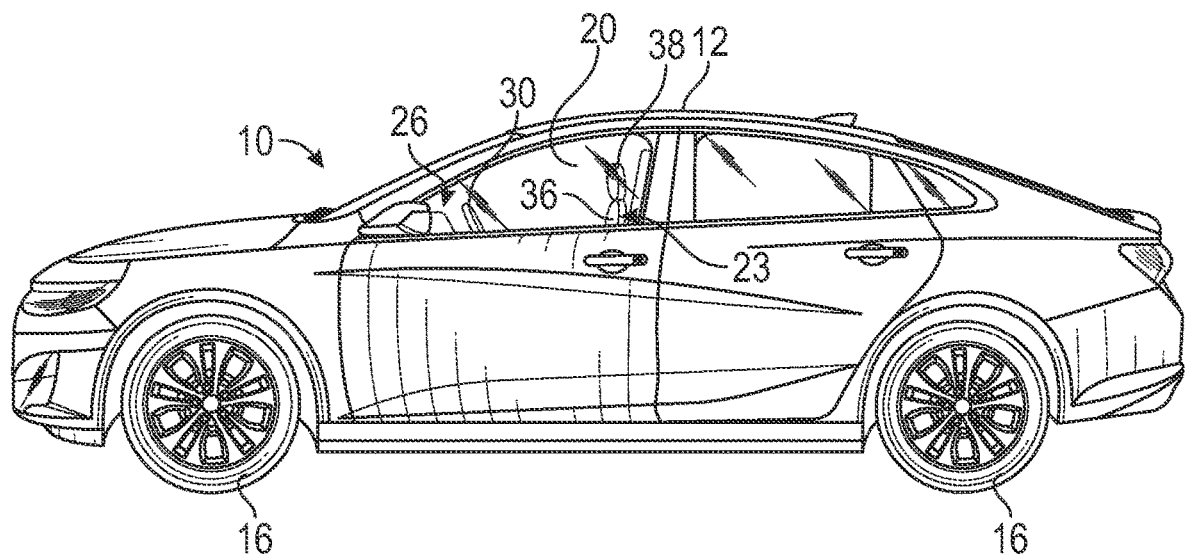
FIG. 1 is a left side view of a vehicle including a vehicle seat having an adjustable support, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 includes a body 12 supported on a plurality of wheels 16. At least two of the plurality of wheels 16 are steerable. Body 12 defines, in part, a passenger compartment 20 having seats, one of which is indicated at 23. Seat 23 is positioned behind a dashboard 26. A steering control system 30 is arranged between seat 23 and dashboard 26.

Figure 2:
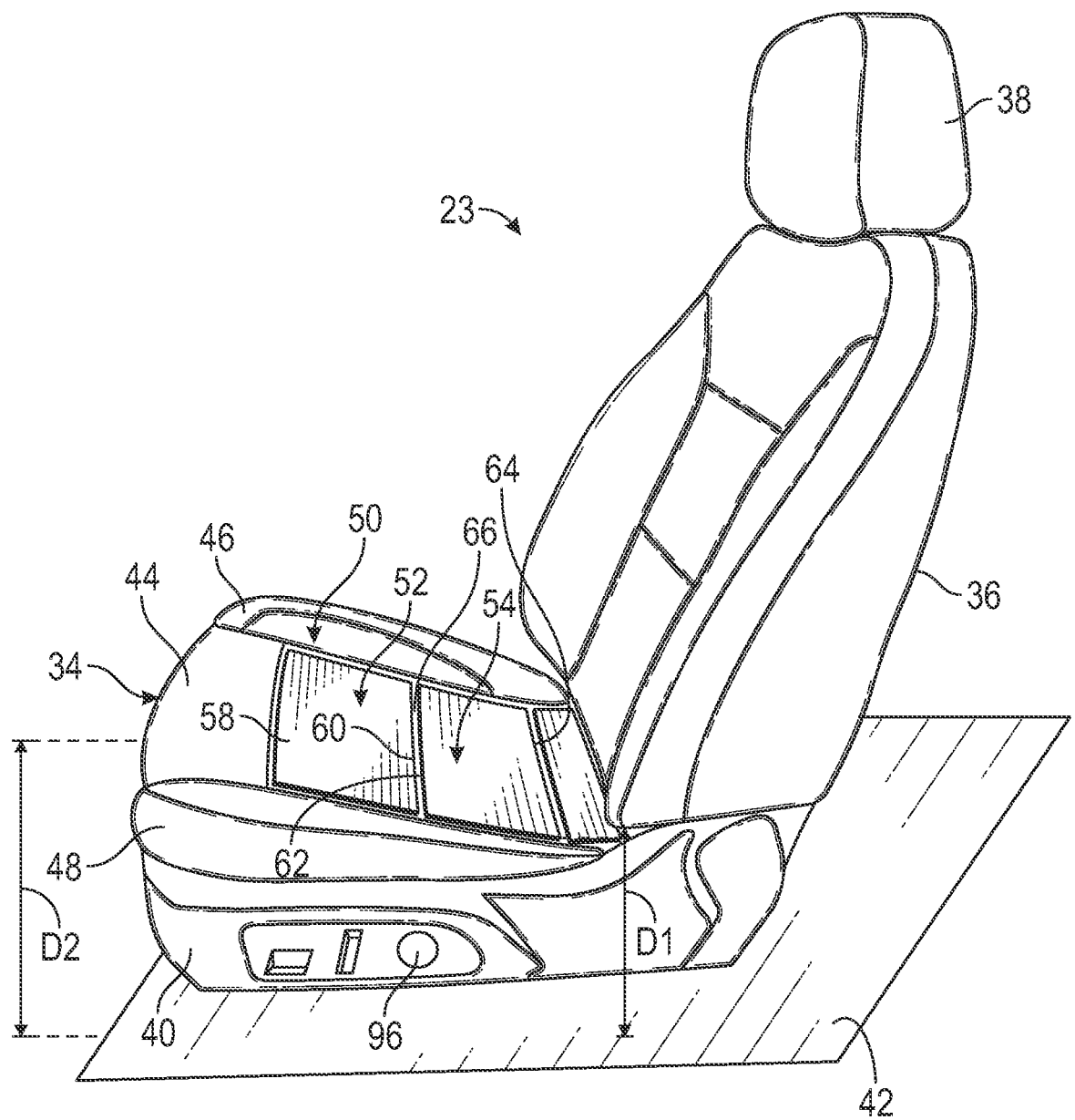
FIG. 2 is a left side perspective view of the vehicle seat of FIG. 1 with the adjustable support in a lowered configuration, in accordance with a non-limiting example.

Referring to FIG. 2 and with continued reference to FIG. 1, seat 23 includes a seat base 34 and a seat back 36 supporting a head rest 38. Seat base 34 includes a frame member 40 slidingly connected to a vehicle floor 42. Seat base 34 is further shown to include a forward bolster or thigh support 44, a first side bolster 46, a second side bolster 48, and a center support 50. Forward bolster 44 defines a forward edge (not separately labeled) of seat 23. First side bolster 46 and second side bolster 48 define raised side edges that help stabilize a passenger's legs during turning maneuvers. In one non-limiting example, center support 50 includes a first member 52 and a second member 54.

Figure 3:
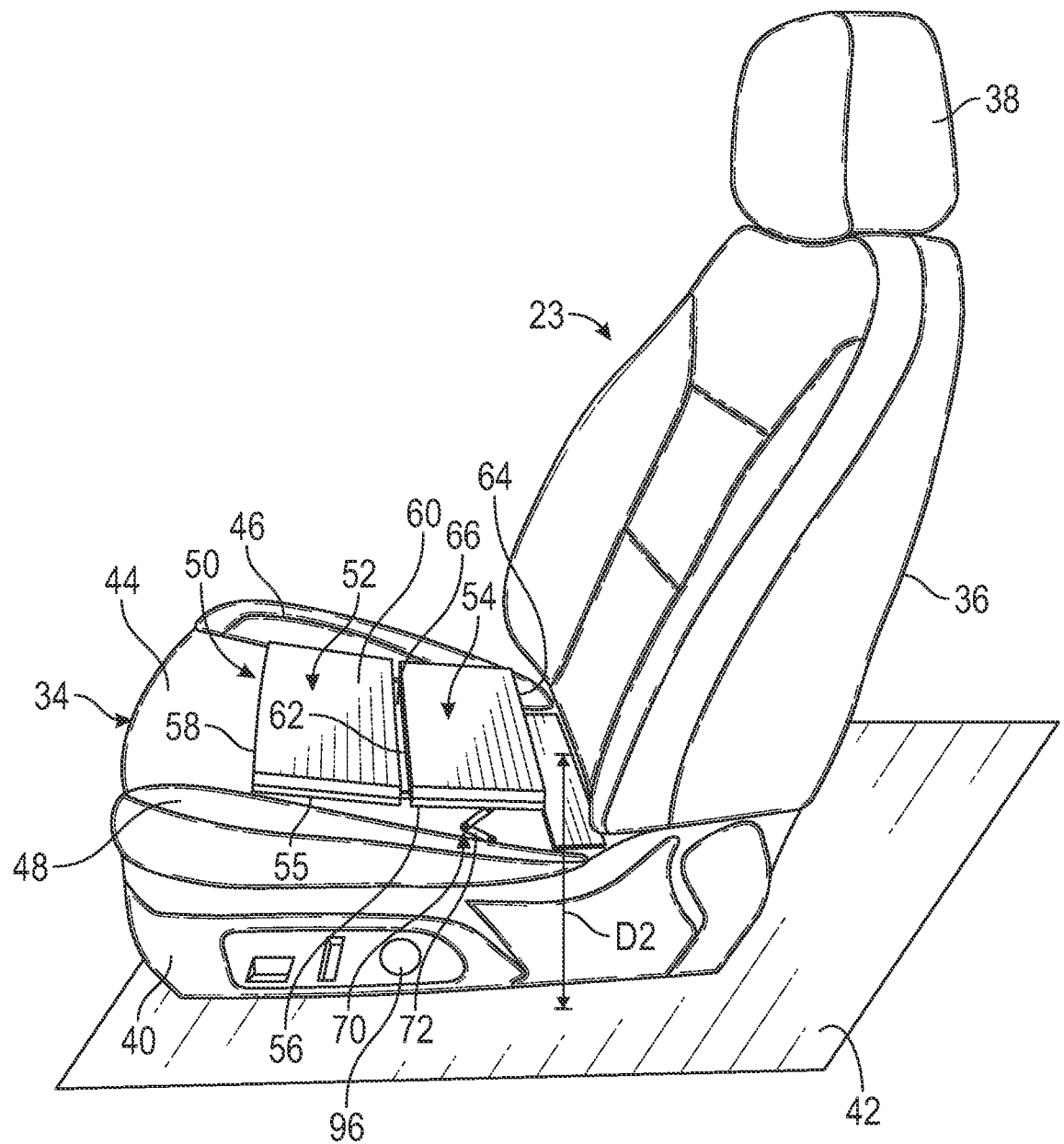
FIG. 3 is a left side perspective view of the vehicle seat of FIG. 2 with the adjustable support in a raised configuration, in accordance with a non-limiting example.

As shown in FIG. 3, first member 52 may sit on a first support member 55 and second member 54 may sit on a second support member 56. As will be detailed herein, first member 52 and second member 54 are selectively adjustable between a first or non-deployed configuration (FIG. 2) and a second or raised configuration (FIG. 3) to ease a passenger's entry and egress from passenger compartment 20. At this point, it should be understood that while gaps (not separately labeled) are shown between first side bolster 46 and second side bolster 48 and first support member 55 and second support member 56 when center support 50 is raised, those gaps are for illustrative purposes and thus may not exist in a commercial embodiment.

In a non-limiting example, first member 52 includes a first end 58 connected relative to seat base 34 aft of forward bolster 44 and a second end 60. Second member 54 includes a first end portion 62 and a second end portion 64. First end portion 62 is mechanically connected to second end 60 of first member 52 through a connector 66. Second end portion 64 may be connected to seat base 34. Connector 66 may take the form of a hinge (not separately labeled) or other form of mechanical connection including solid or fixed connections and moveable connections. It should also be understood that the number of members that make up center support 50 may vary and may include a few as one member or more than two members.

Figure 4:
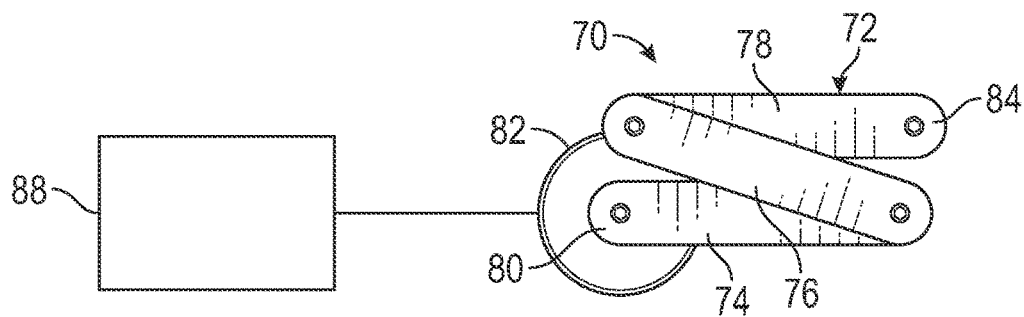
FIG. 4 is a plan view of an adjustment mechanism for the adjustable support in the lowered configuration, in accordance with a non-limiting example.
Figure 5:
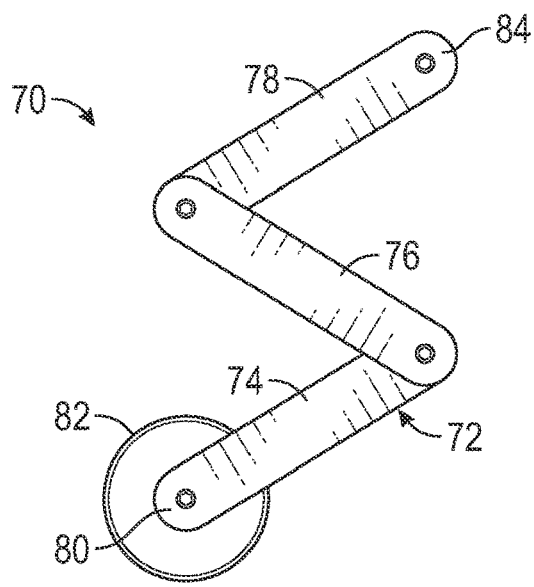
FIG. 5 is a plan view of the adjustment mechanism of FIG. 3 in the raised configuration, in accordance with a non-limiting example.

In a non-limiting example, an adjustment mechanism 70 connects first member 52 and second member 54 with seat base 34. Adjustment mechanism 70 may take the form of a linkage 72 connected between seat base 34 and second end portion 64 of second member 54. Linkage 72 may also be connected at connector 66. In a non-limiting example shown in FIGS. 4 and 5, linkage 72 includes a first link member 74, a second link member 76, and a third link member 78. The number of link members that form linkage 72 may vary. First link member 74 includes a first end section 80 connected to a motor 82. Motor 82, in turn, is fixedly connected relative to seat base 36. Third link member 78 includes a second end section 84 that is connected to center support 50. In a non-limiting example, second end section 84 is connected at second end portion 64 of second member 54.

Figure 6:
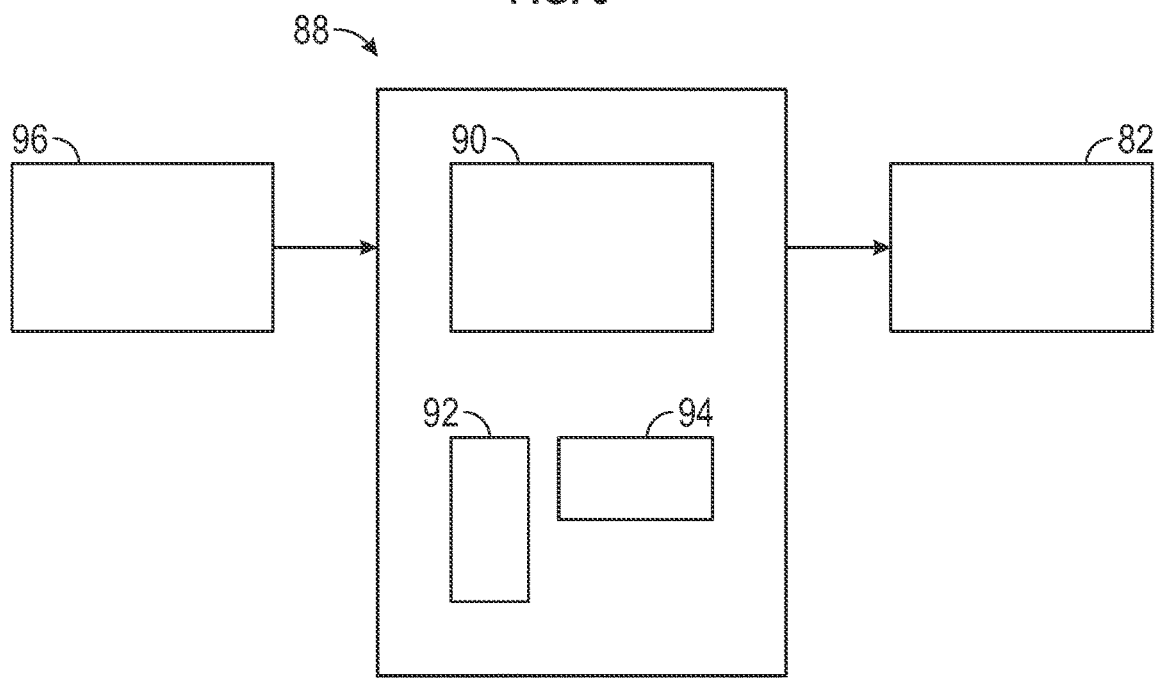
FIG. 6 is a block diagram depicting an actuator mechanism for the adjustable support, in accordance with a non-limiting example.

In a non-limiting example, vehicle 10 includes an actuation mechanism 88 connected to motor 82. As shown in FIG. 6, actuation mechanism 88 includes a central processing unit (CPU) 90, a motor control module 92, and a memory module 94. An actuator 96 is coupled to actuation mechanism 88. Actuator 96 may be mounted to frame member 40 below second side bolster 48. Of course, the particular location of actuator 96 may vary.

In a non-limiting example, center support 50 may be shifted from a retracted position (FIG. 2) where second end portion 64 is spaced from vehicle floor 42 a first distance D1 to a deployed position (FIG. 3) where second end portion 64 is spaced from vehicle floor 42 a second distance D2 when a passenger enters and/or exits passenger compartment 20 of vehicle 10. Thigh support 44 is likewise spaced the second distance D2 from vehicle floor 42. It should be understood that while shown as raising second end portion 44, linkage 72 could be set up to lift first member 52 and second member 54 at connector 66.

Figure 7:
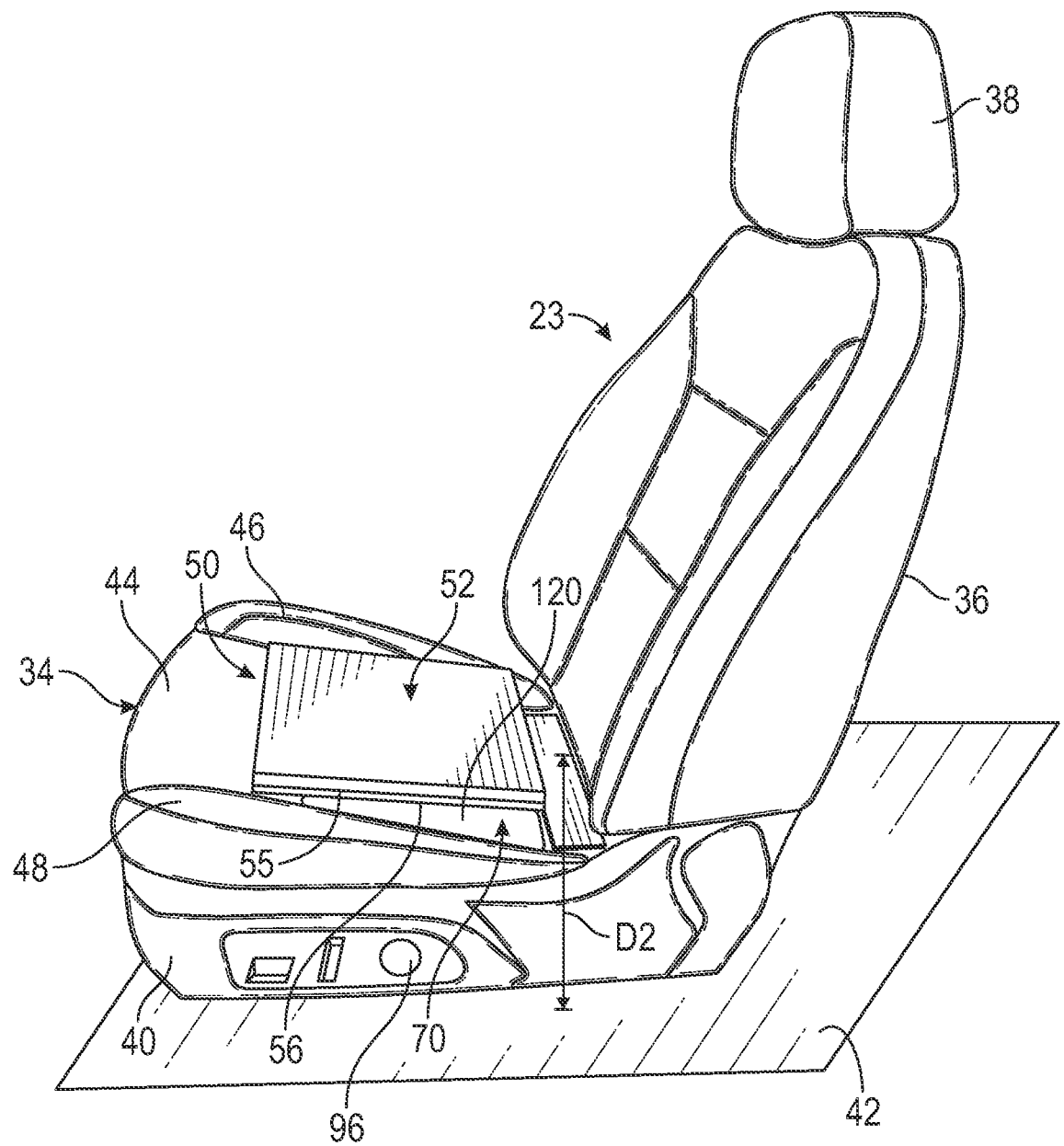
FIG. 7 is a left side perspective view of the vehicle seat of FIG. 2 including an adjustment mechanism, in accordance with another non-limiting example.
Figure 8:
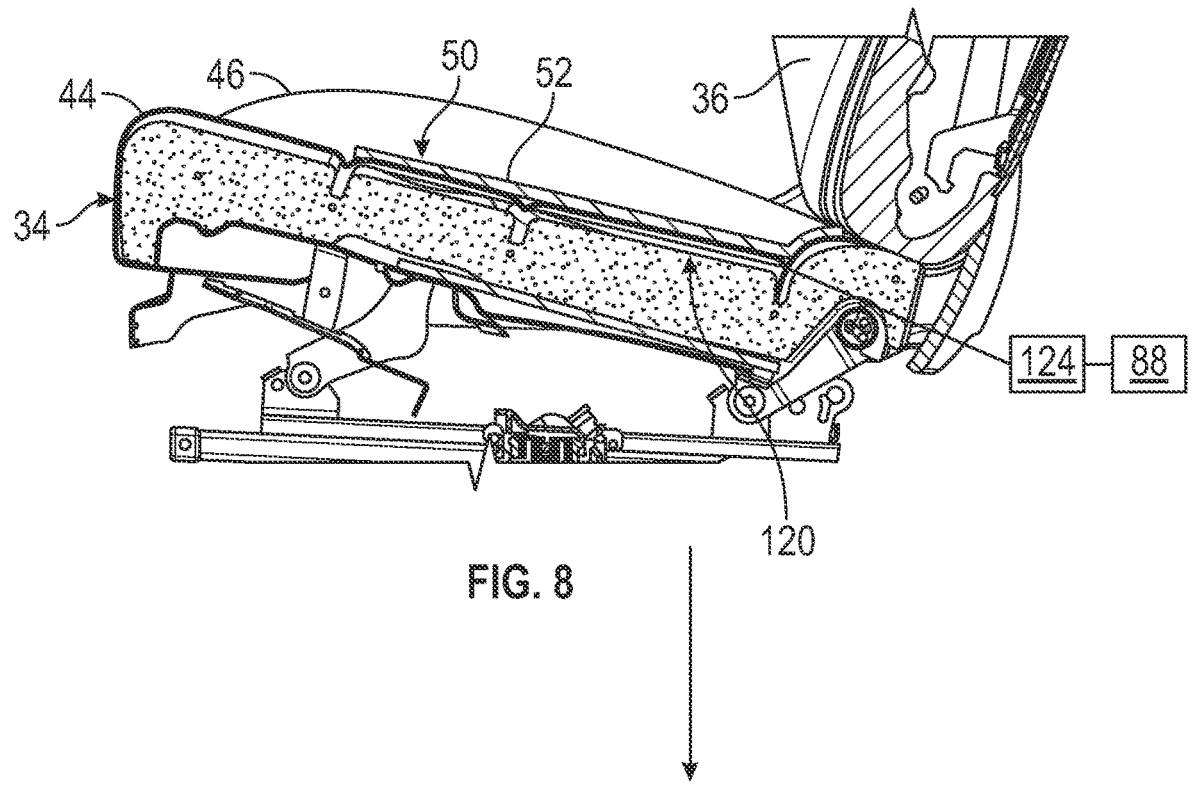
FIG. 8 is a side view of the adjustment mechanism of FIG. 7 in a non-deployed state, in accordance with a non-limiting example.
Figure 9:
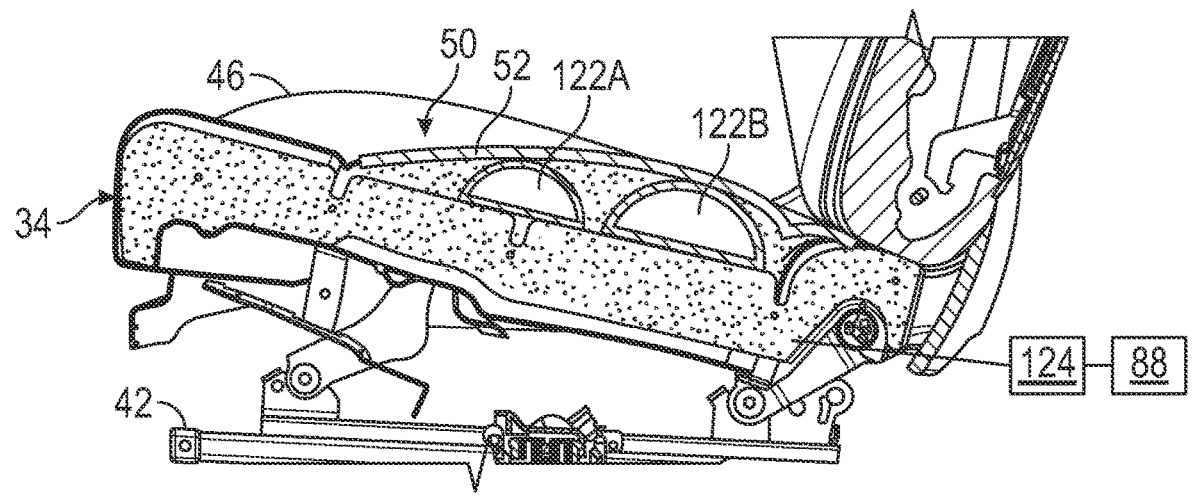
FIG. 9 is a side view of the adjustment mechanism of FIG. 8 in a deployed state, in accordance with a non-limiting example.
Figure 10:
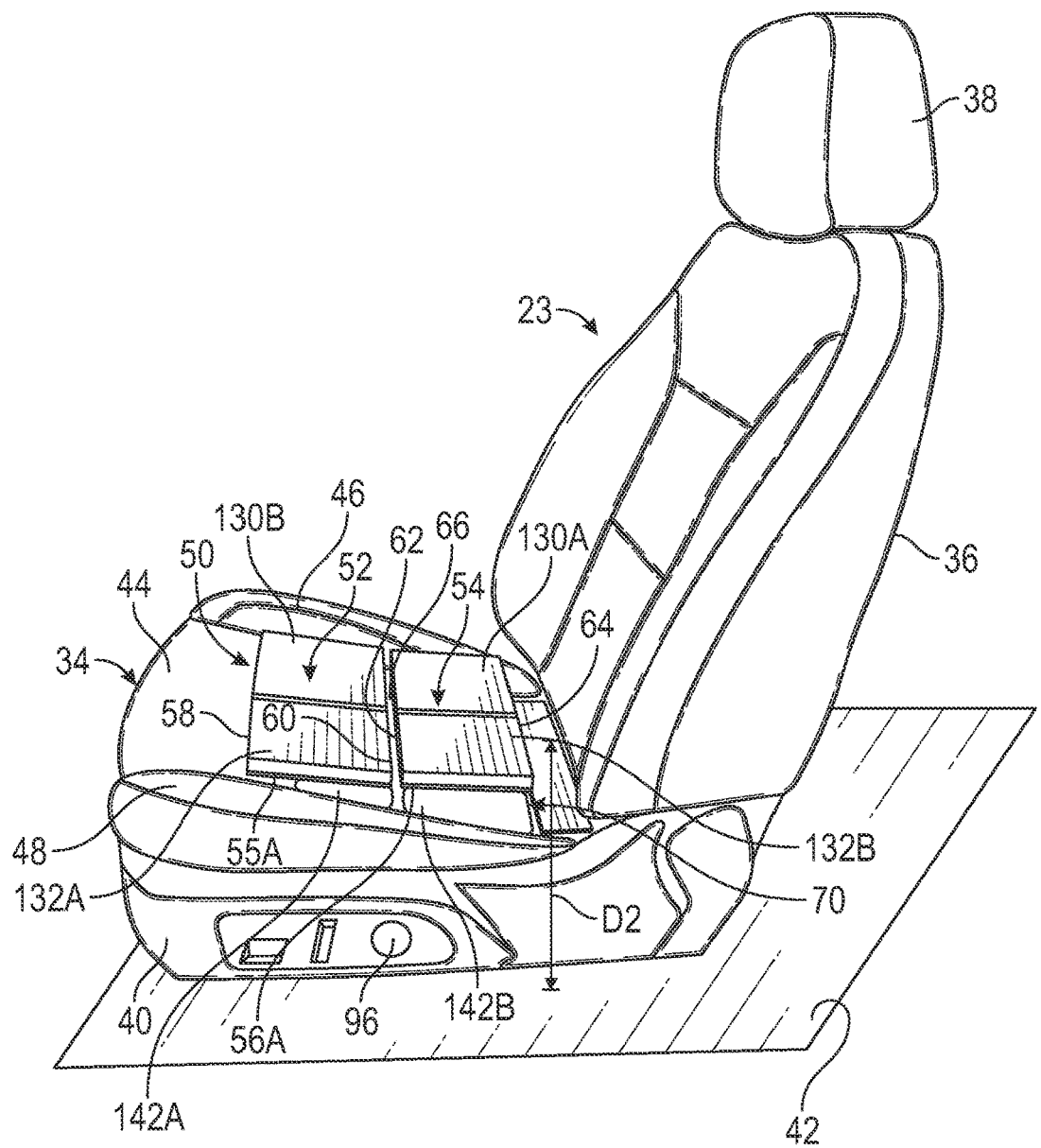
FIG. 10 depicts the vehicle seat including a center support having four separate adjustable support members, in accordance with a non-limiting example.
Figure 11:
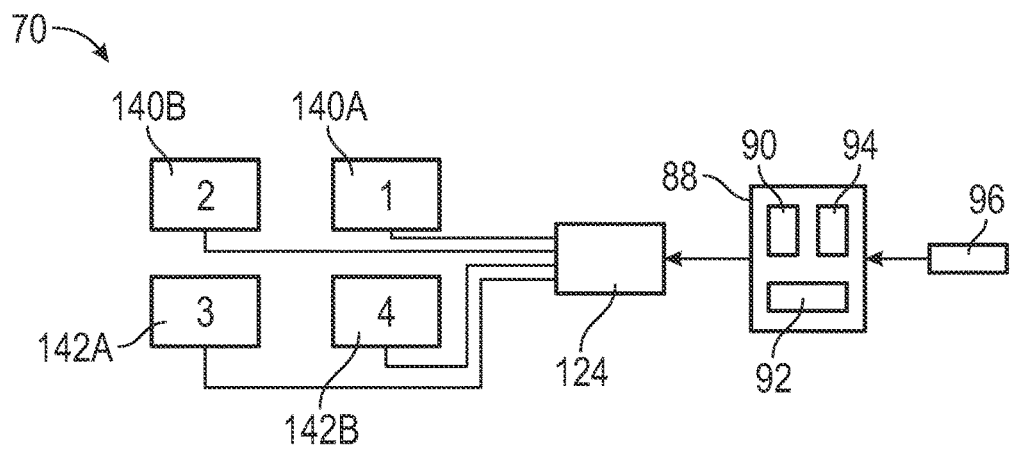
FIG. 11 is a plan view of an adjustment mechanism for selectively deploying one or more of the four separate adjustable support members of FIG. 10, in accordance with a non-limiting example.

Reference will now follow to FIGS. 7, 8, and 9 in describing adjustment mechanism 70 in accordance with another non-limiting example. In the non-limiting example shown in FIG. 7, linkage 72 may not be provided. If linkage 72 is provided, it simply acts as a travel limiter and/or guide. Adjustment mechanism 70 is shown in the form of an inflatable bladder 120 arranged within seat base 34 below center support 50. In the non-limiting example shown, center support includes a single member 52. It should be understood that the number of members may vary. Inflatable bladder 120 is coupled to a pump 124. Pump 124 is operatively connected to actuation mechanism 88. When energized, pump 124 inflates inflatable bladder 120 to lift support member 52 to facilitate ingress into and egress from passenger compartment 20 as will be detailed more fully herein. Inflatable bladder 120 may include one or more inflatable cells 122A and 122B In accordance with another non-limiting example shown in FIGS. 10 and 11, center support 50 of seat base 34 includes a first seat base element 130A, a second seat base element 130B, a third seat base element 132A and a fourth seat base element 132B. Second and third seat base elements 130A and 132A may be arranged on first and second individual support members, one of which is shown at 55A, and first and fourth seat base elements 130B and 132B may be arranged on third and fourth individual support members one of which is indicated at 56A. Each seat base element 130A, 130B, and 132A and 132B is selectively shiftable relative to one another as will be detailed herein.

In a non-limiting example, adjustment mechanism 70 includes a first inflatable bladder 140A, a second inflatable bladder 140B, a third inflatable bladder 142A and a fourth inflatable bladder 142B. First inflatable bladder 140A is arranged below first seat base element 130A, second inflatable bladder 140B is arranged below second seat base element 130B, third inflatable bladder 142A is arranged below third seat base element 132A, and fourth inflatable bladder 142B is arranged below fourth seat base element 132B. Each inflatable bladder 140A, 140B, 142A, and 142B is separately connected to pump 124.

With this arrangement, pump 124 may be controlled to selectively inflate/deflate one or more of inflatable bladder 140A, 140B, 142A, and 142B to facilitate ingress into and egress from passenger compartment 20 of vehicle 10 as will be detailed more fully herein. At this point, it should be understood that while gaps (not separately labeled) are shown between first side bolster 46 and second side bolster 48 and first support member 55A and second support member 56A when center support 50 is raised, those gaps are for illustrative purposes and thus may not exist in a commercial embodiment.

A passenger entering vehicle 10 may find center support 50 deployed after exiting from a previous trip. If not, the passenger need simply activate actuator 96 causing center support 50 to raise from a driving position (FIG. 2) where center support is spaced a first distance D1 from vehicle floor 42 to an enter/exit position (FIG. 3) where center support is spaced a second distance of second distance D2 from vehicle floor 42. In another non-limiting example, motor control module 92 may detect a presence of an occupant through a wireless key entry system (not shown). Second distance D2 is greater than first distance D1. In a non-limiting example, forward bolster 44 is spaced second distance D2 from vehicle floor 42. In the position, center support 50 is spaced at or near second distance D2 from vehicle floor 42. In this manner, center support 50 is at a height that lifts the passengers' hips closer to a heigh of the passengers' knees making entering passenger compartment 20 easier.

In a non-limiting example, motor control module 92 may be programmed through memory 94 and CPU 90 to raise center support 50 when vehicle 10 is unlocked through a fob or through contact with a vehicle door (not separately labeled) or when the vehicle door is opened as will be detailed herein. After entering vehicle 10, the passenger may lower center support 50 to the first position. Lowering may be activated through actuator 96 or simply by starting vehicle 10. After traveling, passenger may raise center support 50 to facilitate egress from passenger compartment.

Center support 50 may be raised through use of actuator 96 or by turning vehicle 10 off. At this point, it should be understood that the non-limiting examples disclosed herein describe a system for raising a center support of a vehicle seat to a height that reduces a distance between a passenger's hips and knees. By reducing the hip-to-knee distance, entering, and exiting the vehicle is made easier.

Figure 12:
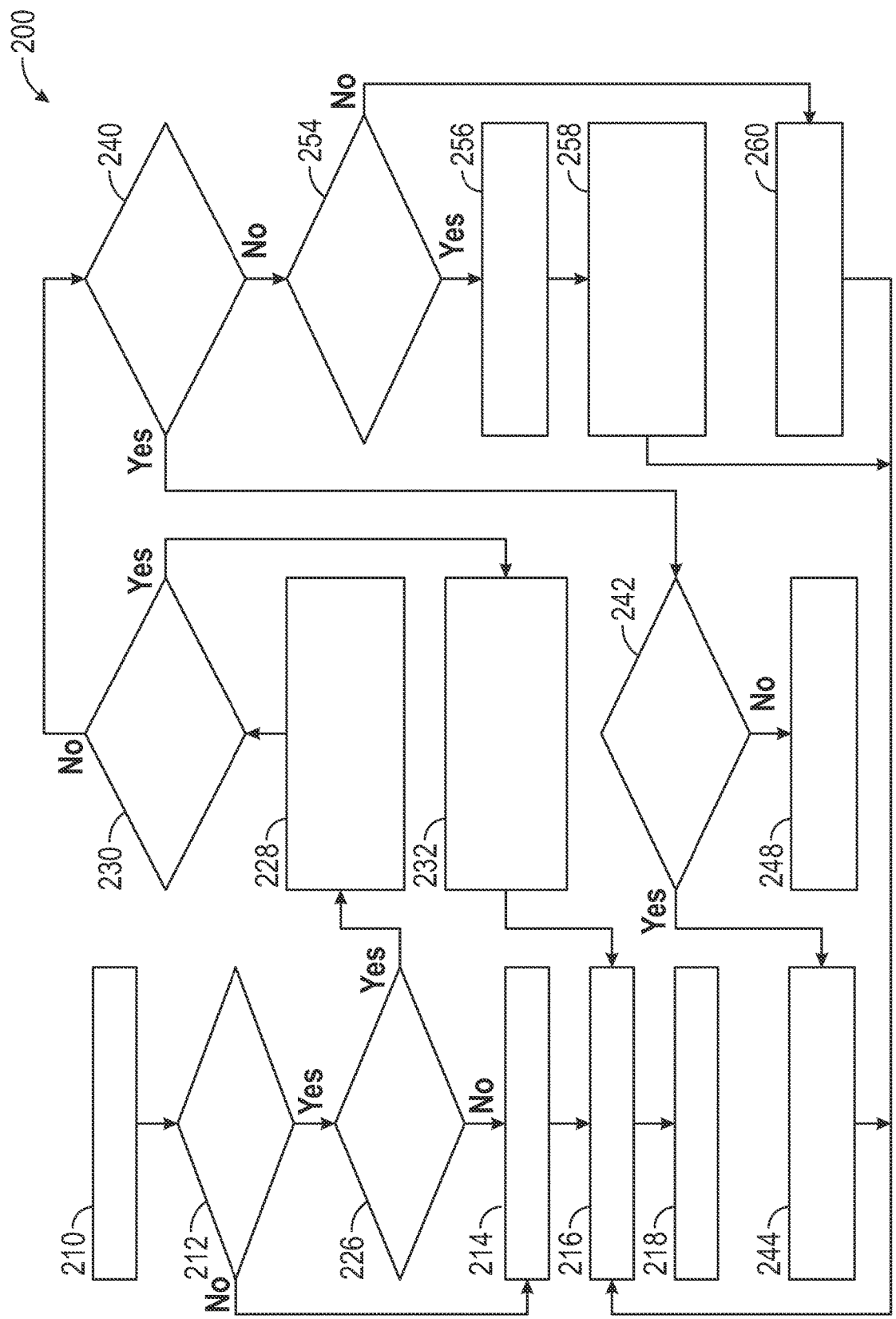
FIG. 12 is a flow diagram illustrating a method of adjusting a center support for a vehicle seat, in accordance with a non-limiting example.

Reference will follow to FIG. 12 in describing a method 200 of adjusting center support 50 in accordance with a non-limiting example. In block 210, a determination is made whether a door open sensor has triggered. In block 212 a determination is made whether center support adjustment is enabled. If not enabled, adjustment mechanism 70 is not activated in block 214, center support 50 does not change position, and seat base 34 is left in a driving configuration in block 216, and vehicle 10 is shown as being ready to drive in block 218. If in block 212 a determination is made that the center support adjustment is enabled, a determination is made in block 226 whether a transmission in vehicle 10 is in park. If not, method 200 goes to block 214. If the transmission is in park, actuation mechanism 88 signals motor control module 96 to operate adjustment mechanism 70 to raise center support 50 at block 228.

In block 230, a determination is made whether vehicle door is closed or the transmission is taken out of park. If the door is closed and/or if the transmission is taken out of park, method 200 passes to block 232 and adjustment mechanism 70 is de-energized placing seat 23 in a driving configuration in block 216. If the vehicle door is not closed and/or the transmission is left in park, a determination is made whether an occupant is detected in seat base 34 in block 240 prior to detecting the door opening in block 210. A variety of sensors, including pressure sensors (not shown) may be used to detect a presence of an occupant.

If after determining that an occupant is in seat 23, a determination is made whether the occupant has left seat 23 in block 242, actuation mechanism 88 de-energizes adjustment mechanism 70 after a pre-determined amount of time that is stored in memory module 94 in block 244 allowing and center support 50 to lower to the driving position. The amount of time may be a factory pre-set or may be a user selected preference input into actuation mechanism 88 and stored in memory module 94. If, in block 242 a determination is made that the occupant has not left the seat. A timer is initiated in block 248. At the end of a selected time as recalled from memory module 94, method 200 passes to block 216.

If in block 240 a determination is made that there was not an occupant in seat 23 prior to detecting that the door opened in block 210, a determination is made whether an occupant sat in the seat in block 254. If an occupant sat in seat 23 in block 254 adjustment mechanism 70 is deactivated after a selected time period recalled from memory module 94 in block 256 and, if provided, seat 23 may move to a pre-set position in block 258. As discussed herein, the predetermined period of time may be a factory pre-set or a user selected quantity. If factory presets are not provided or user preferences are not stored in memory module 94 seat 23 may move to the driving position in block 216. If it was determined in block 254 that an occupant was not in seat 23, adjustment mechanism 70 is deactivated in block 260 after a selected time period and seat 23 moves to the driving position in block 216.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle seat comprising:
   a seat base including a center support;
   a seat back mounted to the seat base; and
   an adjustment mechanism operatively connected to the center support, the adjustment mechanism being operable to selectively raise and lower the center support relative to the seat base,
   wherein the seat base comprises a forward bolster disposed forward of the center support,
   wherein the center support is adjustable via the adjustment mechanism between a first position and a second position,
   wherein a portion of the center support is spaced from a vehicle floor by a first distance in the first position and by a second distance in the second position, and
   wherein a front edge of the forward bolster is spaced from the vehicle floor by the second distance when the center support is in the first position and in the second position.

2. The vehicle seat according to claim 1, wherein the center support includes a first end pivotally connected to the seat base, and a second end connected to the adjustment mechanism.

3. The vehicle seat according to claim 2, wherein the adjustment mechanism includes a linkage operatively connected to a motor, the motor being operable to raise the second end of the center support.

4. The vehicle seat according to claim 2, further comprising an actuator operatively connected to the adjustment mechanism, the actuator being mounted to the seat base.

5. The vehicle seat according to claim 2, wherein the adjustment mechanism comprises an inflatable bladder.

6. The vehicle seat according to claim 1, wherein the center support includes a plurality of members that are selectively shiftable through the adjustment mechanism.

7. The vehicle seat according to claim 1, wherein the seat base comprises a first side bolster and a second side bolster, the center support being positioned inwardly of the first side bolster and the second side bolster, and
   wherein, when the center support is in the second position, at least a portion of the center support is positioned above portions of the first side bolster and the second side bolster adjacent to the portion of the center support.

8. A vehicle comprising:
   a body defining a passenger compartment and a vehicle floor; and
   a seat mounted in the passenger compartment, the seat comprising:
   a seat base including a center support;
   a seat back mounted to the seat base; and
   an adjustment mechanism operatively connected to the center support, the adjustment mechanism being operable to selectively raise and lower the center support relative to the seat base,
   wherein the seat base comprises a forward bolster disposed forward of the center support,
   wherein the center support is adjustable via the adjustment mechanism between a first position and a second position,
   wherein a portion of the center support is spaced from a vehicle floor by a first distance in the first position and by a second distance in the second position, and
   wherein a front edge of the forward bolster is spaced from the vehicle floor by the second distance when the center support is in the first position and in the second position.

9. The vehicle according to claim 8, wherein the center support includes a first end pivotally connected to the seat base, and a second end connected to the adjustment mechanism.

10. The vehicle according to claim 9, wherein the adjustment mechanism includes a linkage operatively connected to a motor, the motor being operable to raise the second end of the center support.

11. The vehicle according to claim 9, further comprising an actuator operatively connected to the adjustment mechanism, the actuator being mounted to the seat base.

12. The vehicle according to claim 9, wherein the adjustment mechanism comprises an inflatable bladder.

13. The vehicle according to claim 8, wherein the center support includes a plurality of members that are selectively shiftable through the adjustment mechanism.

14. The vehicle according to claim 8, wherein the seat base comprises a first side bolster and a second side bolster, the center support being positioned inwardly of the first side bolster and the second side bolster, and
   wherein, when the center support is in the second position, at least a portion of the center support is positioned above portions of the first side bolster and the second side bolster adjacent to the portion of the center support.

15. The vehicle of claim 8, further comprising a vehicle door and a controller,
   wherein the controller is configured to automatically actuate the adjustment mechanism to adjust the central support to the second position when the vehicle door is unlocked or opened.

16. A method of adjusting a support of a seat base in a vehicle comprising:
- activating an adjustment mechanism to raise the center support from a first position to a second position; and
- raising the center support about a first end connected relative to a seat base,
- wherein the seat base comprises a forward bolster disposed forward of the center support,
- wherein a portion of the center support is spaced from the vehicle floor by a first distance in the first position and by a second distance in the second position, and
- wherein a front edge of the forward bolster is spaced from the vehicle floor by the second distance in the first position and the second position.

17. The method of claim 16, wherein raising the center support includes extending a linkage including a first link member rotatably supported to the seat base and a second link member rotatably coupled to the first link member and the center support.

18. The method of claim 16, wherein raising the center support includes inflating an inflatable bladder arranged below the center support.

19. The method of claim 16, wherein raising the center support is automatically actuated upon one of unlocking a vehicle door and opening the vehicle door.

20. The method of claim 16, wherein the seat base comprises a first side bolster and a second side bolster, the center support being positioned inwardly of the first side bolster and the second side bolster, and
- wherein, when the center support is in the second position, at least a portion of the center support is positioned above portions of the first side bolster and the second side bolster adjacent to the portion of the center support.

* * * * *